(12) United States Patent
Wang et al.

(10) Patent No.: US 9,836,053 B2
(45) Date of Patent: Dec. 5, 2017

(54) SYSTEM AND METHOD FOR AUTOMATED AERIAL SYSTEM OPERATION

(71) Applicant: Hangzhou Zero Zero Technology Co., Ltd., Hangzhou, Zhejiang Prov. (CN)

(72) Inventors: Mengqiu Wang, Hangzhou (CN); Lixin Liu, Hangzhou (CN); Pengxiang Jin, Hangzhou (CN); Jia Lu, Hangzhou (CN); Tong Zhang, Hangzhou (CN)

(73) Assignee: Zero Zero Robotics Inc., Wilmington, DE (US)

(*) Notice: Subject to any disclaimer, the term of this patent is extended or adjusted under 35 U.S.C. 154(b) by 41 days.

(21) Appl. No.: 15/349,749

(22) Filed: Nov. 11, 2016

(65) Prior Publication Data

US 2017/0185084 A1    Jun. 29, 2017

Related U.S. Application Data

(60) Provisional application No. 62/099,512, filed on Jan. 4, 2015, provisional application No. 62/353,337, filed on Jun. 22, 2016, provisional application No. 62/326,600, filed on Apr. 22, 2016.

(51) Int. Cl.
*G05D 1/00* (2006.01)
*G05D 1/04* (2006.01)
*B64C 39/02* (2006.01)

(52) U.S. Cl.
CPC ......... *G05D 1/0088* (2013.01); *B64C 39/024* (2013.01); *G05D 1/042* (2013.01); *B64C 2201/141* (2013.01)

(58) Field of Classification Search
CPC ................................. B64D 1/12; B64D 1/08
See application file for complete search history.

(56) References Cited

U.S. PATENT DOCUMENTS

| | | | |
|---|---|---|---|
| 7,341,223 B2 * | 3/2008 | Chu | ........................ B64B 1/14 244/24 |
| 8,903,568 B1 | 12/2014 | Wang et al. | |
| 9,085,355 B2 * | 7/2015 | DeLorean | ........... B64C 29/0033 |
| 9,266,609 B1 * | 2/2016 | Kunz | ................... B64C 29/0008 |
| 9,321,531 B1 * | 4/2016 | Takayama | ................ B64D 1/12 |
| 9,346,543 B2 | 5/2016 | Kugelmass | |

(Continued)

FOREIGN PATENT DOCUMENTS

| | | |
|---|---|---|
| CN | 104486543 | 4/2015 |
| CN | 105425952 | 3/2016 |
| WO | 2016080598 A1 | 5/2016 |

*Primary Examiner* — Thomas Tarcza
*Assistant Examiner* — Alex C Dunn
(74) *Attorney, Agent, or Firm* — Jeffrey Schox; Diana Lin

(57) ABSTRACT

A method for controlling an aerial system with a rotor enclosed by a housing, including: operating the rotor in a flight mode, detecting a grab event indicative of the aerial system being grabbed, and automatically operating the rotor in a standby mode. A method for controlling an aerial system including a central axis extending normal to a lateral plane of the aerial system, including: generating a first aerodynamic force with a set of rotors enclosed by a housing, detecting that an acute angle between the central axis and a gravity vector is greater than a threshold angle, and operating each rotor of the set of rotors to cooperatively generate a second aerodynamic force less than the first aerodynamic force with the set of rotors.

22 Claims, 10 Drawing Sheets

(56) References Cited

U.S. PATENT DOCUMENTS

| | | | |
|---|---|---|---|
| 9,429,141 B2* | 8/2016 | Vander Lind | F03D 7/0204 |
| 9,493,235 B2* | 11/2016 | Zhou | B60F 5/02 |
| 9,527,597 B1* | 12/2016 | Sada | B64C 39/024 |
| 2005/0004723 A1* | 1/2005 | Duggan | G05D 1/0061 |
| | | | 701/24 |
| 2011/0221692 A1 | 9/2011 | Seydoux | |
| 2012/0097801 A1* | 4/2012 | Barrett | B64C 27/24 |
| | | | 244/7 A |
| 2012/0200703 A1 | 8/2012 | Nadir et al. | |
| 2014/0158816 A1* | 6/2014 | DeLorean | B64C 29/0033 |
| | | | 244/12.4 |
| 2015/0120336 A1* | 4/2015 | Grokop | B60W 40/09 |
| | | | 705/4 |
| 2015/0179219 A1 | 6/2015 | Gao et al. | |
| 2015/0183512 A1* | 7/2015 | Jensen | B64C 39/022 |
| | | | 244/76 R |
| 2016/0080598 A1 | 3/2016 | Chen et al. | |
| 2016/0101856 A1 | 4/2016 | Kohstall | |
| 2016/0122038 A1 | 5/2016 | Fleischman et al. | |
| 2016/0191793 A1 | 6/2016 | Yang et al. | |
| 2016/0221671 A1 | 8/2016 | Fisher et al. | |
| 2016/0221683 A1* | 8/2016 | Roberts | B64D 27/02 |
| 2017/0011333 A1* | 1/2017 | Greiner | G06Q 10/083 |

* cited by examiner

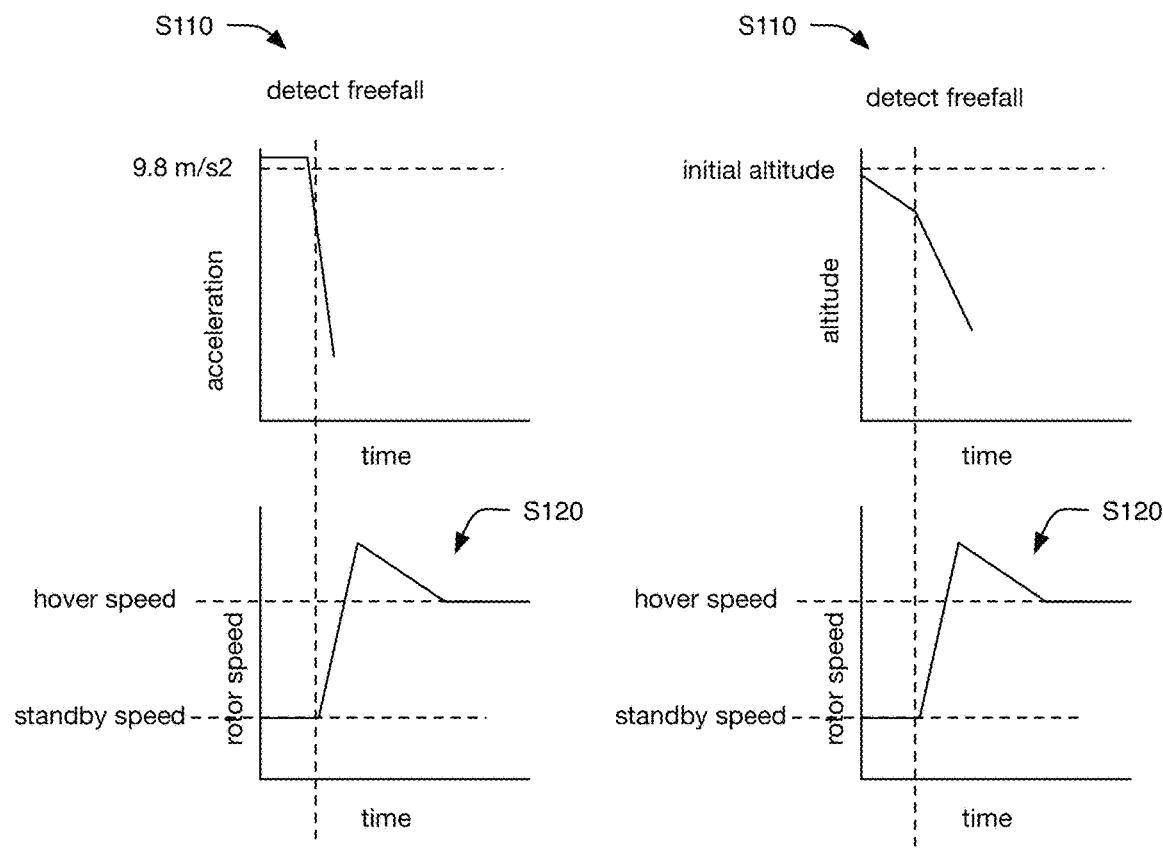

SYSTEM AND METHOD FOR AUTOMATED AERIAL SYSTEM OPERATION

CROSS-REFERENCE TO RELATED APPLICATIONS

This application is a continuation-in-part of International Applications: PCT/CN2015/099339 filed 29 Dec. 2015, currently pending, which claims the priority of U.S. Patent Application No. 62/099,512 filed 4 Jan. 2015 and Chinese Patent Application No. 201510547151.3 filed 31 Aug. 2015; PCT/CN2016/070579 filed 11 Jan. 2016, currently pending, which claims the priority of Chinese Patent Application No. 201510487415.0 filed 10 Aug. 2015, PCT/CN2016/070583 filed 11 Jan. 2016, currently pending, which claims the priority of Chinese Patent Application No. 201510487744.5 filed 10 Aug. 2015, and PCT/CN2016/070581 filed 11 Jan. 2016, currently pending, which claims the priority of Chinese Patent Application No. 201510487412.7 filed 10 Aug. 2015, all of which are incorporated in their entireties by this reference.

This application claims the benefit of U.S. Provisional Application No. 62/353,337, filed 22 Jun. 2016, and U.S. Provisional Application No. 62/326,600, filed 22 Apr. 2016, which are both incorporated in their entireties by this reference.

TECHNICAL FIELD

This invention relates generally to the aerial system field, and more specifically to a new and useful system and method for automated aerial system operation in the aerial system field.

BRIEF DESCRIPTION OF THE FIGURES

FIGS. 3 and 4 are a first and second specific example of detecting a change in an orientation sensor signal indicative of an imminent operation event and automatically operating the lift mechanisms based on the detected change, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
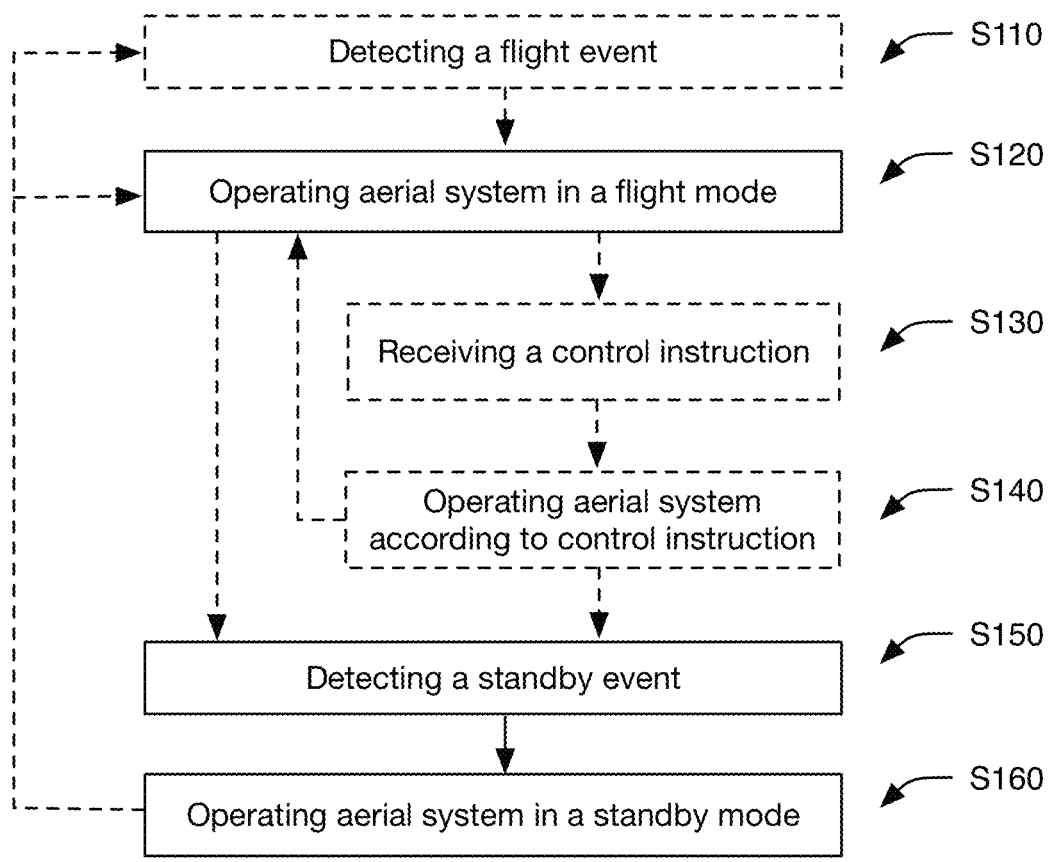
FIG. 1 is a flowchart diagram of the method for automatic aerial system operation.

As shown in FIG. 1, the method 100 for automatic aerial system operation includes: operating the aerial system in a flight mode S120, detecting a standby event S150, and operating the aerial system in a standby mode S160. The method 100 can additionally include: detecting a flight event S110, receiving a control instruction S130, and/or operating the aerial system according to the control instruction S140.

Figure 2:
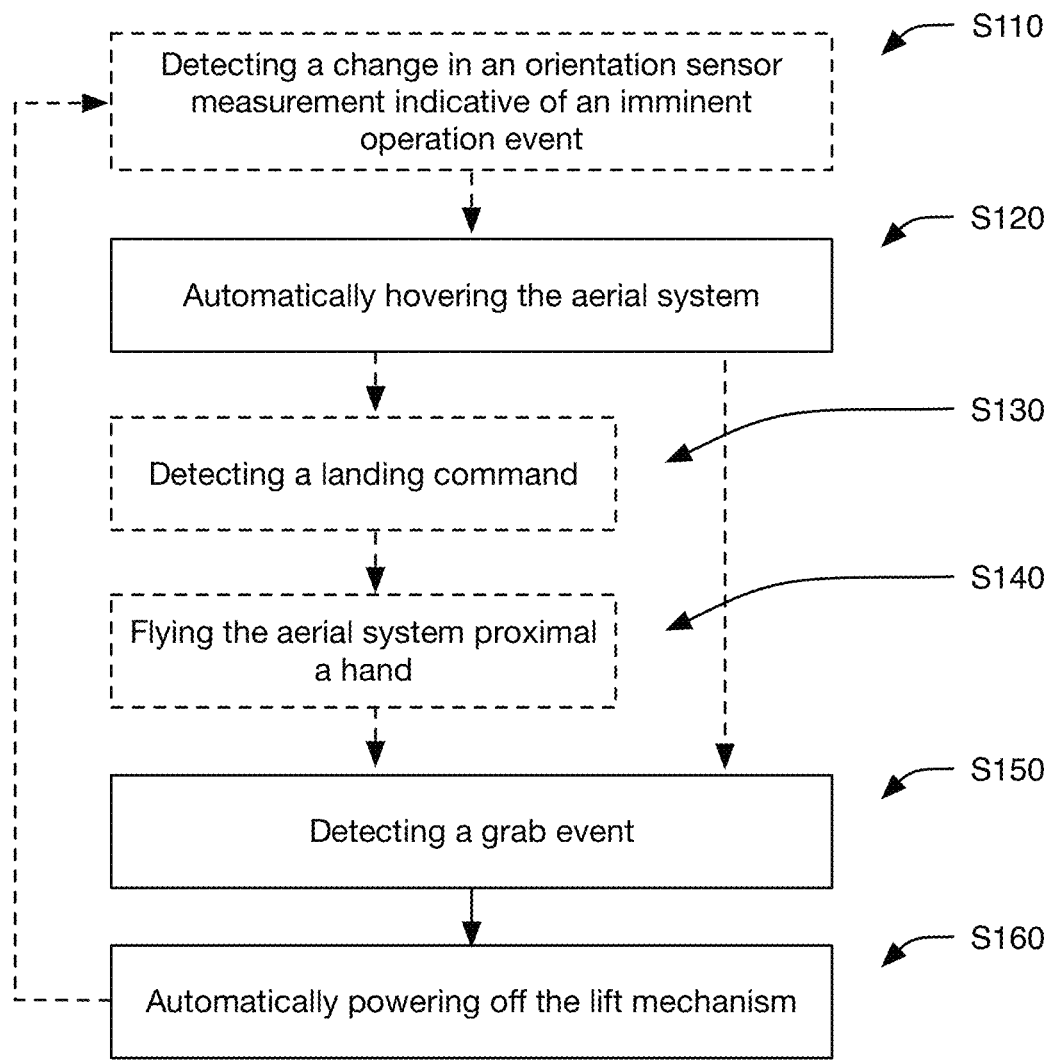
FIG. 2 is a flowchart diagram of a variation of the method for automatic aerial system operation.

The method functions to automatically cease aerial system flight, independent of control instruction receipt. In a first variation, the aerial system automatically detects that the aerial system has been restrained during flight and automatically operates in a standby mode in response to determination of aerial system restraint. In a specific example, the aerial system slows down or stops the lift mechanism once it detects that a user has grabbed the aerial system mid-flight or mid-air (e.g., as shown in FIG. 2). In a second variation, the aerial system automatically identifies a landing site and automatically operates to land on the landing site. In a first specific example, the aerial system automatically detects a user's hand below the aerial system (e.g., using a camera with a field of view directed downward and visual analysis methods) and gradually slows the propeller speed to land the aerial system on the user's hand. In a second specific example, the aerial system automatically detects a landing site in front of the aerial system, automatically flies toward the landing site, and automatically controls the lift mechanism to land on the landing site. However, the method can otherwise cease aerial system flight.

The method can additionally function to automatically fly the aerial system, independent of control instruction receipt. In a first variation, the aerial system automatically hovers (e.g., in place) when the aerial system is released (e.g., from a user's hand). In a second variation, the aerial system automatically flies along a force application vector, stops, and hovers in response to the aerial system being thrown or pushed along the force application vector. In a third variation, the aerial system can automatically take off from a user's hand. However, the method can otherwise fly the aerial system.

2. Benefits

This method can confer several benefits over conventional systems. First, by automatically entering an aerial system standby mode, automatically flying in response to aerial system release, and/or automatically landing on a user's hand or user-specified landing site, the method enables more intuitive user interactions with the aerial system. Second, by automatically operating independent of outside control instruction receipt, the method frees a user from controlling those aspects of aerial system flight. This can enable the user to control auxiliary systems (e.g., camera systems), minimize multitasking, or otherwise reduce user interaction required for aerial system flight. However, the method can confer any other suitable set of benefits.

3. System.

Figure 5:
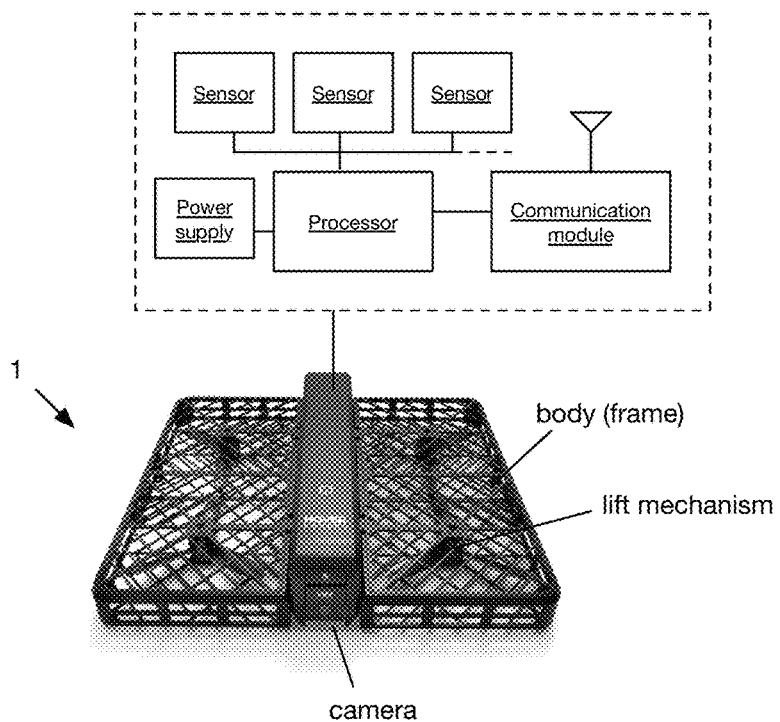
FIG. 5 is a schematic representation of a variation of the aerial system.
Figure 6:
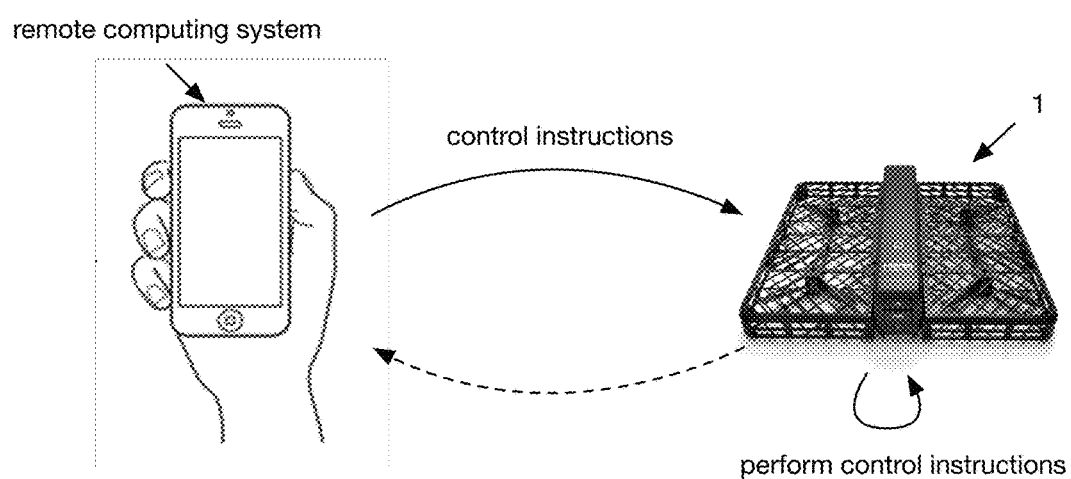
FIG. 6 is a schematic representation of the system, including an aerial system and a remote computing system.

As shown in FIG. 5, the method is preferably used with one or more aerial systems 1, and can optionally be used with a remote computing system (example shown in FIG. 6), or with any other suitable system. The aerial system 1 functions to fly, and can additionally function to take photographs, deliver loads, and/or relay wireless communications. The aerial system 1 is preferably a rotorcraft (e.g., quadcopter, helicopter, cyclocopter, etc.), but can alternatively be a fixed-wing aircraft, aerostat, or be any other suitable aerial system 1. The aerial system 1 can include a lift mechanism, a power supply, sensors, a processing system, a communication system, a body, and/or include any other suitable component.

The lift mechanism of the aerial system functions to provide lift, and preferably includes a set of rotors driven (individually or collectively) by one or more motors. Each rotor is preferably configured to rotate about a corresponding rotor axis, define a corresponding rotor plane normal to its rotor axis, and sweep out a swept area on its rotor plane. The motors are preferably configured to provide sufficient power to the rotors to enable aerial system flight, and are more preferably operable in two or more modes, at least one of which includes providing sufficient power for flight and at least one of which includes providing less power than required for flight (e.g., providing zero power, providing 10% of a minimum flight power, etc.). The power provided by the motors preferably affects the angular velocities at which the rotors rotate about their rotor axes. During aerial system flight, the set of rotors are preferably configured to cooperatively or individually generate (e.g., by rotating about their rotor axes) substantially all (e.g., more than 99%, more than 95%, more than 90%, more than 75%) of the total aerodynamic force generated by the aerial system 1 (possibly excluding a drag force generated by the body such as during flight at high airspeeds). Alternatively or additionally, the aerial system 1 can include any other suitable flight components that function to generate forces for aerial system flight, such as jet engines, rocket engines, wings, solar sails, and/or any other suitable force-generating components.

In one variation, the aerial system 1 includes four rotors, each arranged at a corner of the aerial system body. The four rotors are preferably substantially evenly dispersed about the aerial system body, and each rotor plane is preferably substantially parallel (e.g., within 10 degrees) a lateral plane of the aerial system body (e.g., encompassing the longitudinal and lateral axes). The rotors preferably occupy a relatively large portion of the entire aerial system 1 (e.g., 90%, 80%, 75%, or majority of the aerial system footprint, or any other suitable proportion of the aerial system 1). For example, the sum of the square of the diameter of each rotor can be greater than a threshold amount (e.g., 10%, 50%, 75%, 90%, 110%, etc.) of the convex hull of the projection of the aerial system 1 onto a primary plane of the system (e.g., the lateral plane). However, the rotors can be otherwise arranged.

The power supply of the aerial system functions to power the active components of the aerial system (e.g., lift mechanism's motors, power supply, etc.). The power supply can be mounted to the body and connected to the active components, or be otherwise arranged. The power supply can be a rechargeable battery, secondary battery, primary battery, fuel cell, or be any other suitable power supply.

The sensors of the aerial system function to acquire signals indicative of the aerial system's ambient environment and/or aerial system operation. The sensors are preferably mounted to the body, but can alternatively be mounted to any other suitable component. The sensors are preferably powered by the power supply and controlled by the processor, but can be connected to and interact with any other suitable component. The sensors can include one or more: cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor. In one variation, the aerial system 1 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number of any sensor type.

The processing system of the aerial system functions to control aerial system operation. The processing system can perform the method; stabilize the aerial system 1 during flight (e.g., selectively operate the rotors to minimize aerial system wobble in-flight); receive, interpret, and operate the aerial system 1 based on remote control instructions; or otherwise control aerial system operation. The processing system is preferably configured to receive and interpret measurements sampled by the sensors, more preferably by combining measurements sampled by disparate sensors (e.g., combining camera and accelerometer data). The aerial system 1 can include one or more processing systems, wherein different processors can perform the same functionality (e.g., function as a multi-core system), or be specialized. The processing system can include one or more: processors (e.g., CPU, GPU, microprocessor, etc.), memory (e.g., Flash, RAM, etc.), or any other suitable component. The processing system is preferably mounted to the body, but can alternatively be mounted to any other suitable component. The processing system is preferably powered by the power supply, but can be otherwise powered. The processing system is preferably connected to and controls the sensors, communication system, and lift mechanism, but can additionally or alternatively be connected to and interact with any other suitable component.

The communication system of the aerial system functions to communicate with one or more remote computing systems. The communication module can be a long-range communication module, a short-range communication module, or any other suitable communication module. The communication module can facilitate wired and/or wireless communication. Examples of the communication module include a 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication module or combination thereof. The communication system is preferably powered by the power supply, but can be otherwise powered. The communication system is preferably connected to the processing system, but can additionally or alternatively be connected to and interact with any other suitable component.

The body of the aerial system functions to support the aerial system components. The body can additionally function to protect the aerial system components. The body preferably substantially encapsulates the communication system, power source, and processing system, but can be otherwise configured. The body can include a platform, a housing, or have any other suitable configuration. In one variation, the body includes a main body housing the communication system, power source, and processing system, and a first and second frame (e.g., cage) extending parallel the rotor rotational plane and arranged along a first and second side of the main body. The frames can function as an intermediary component between the rotating rotors and a retention mechanism (e.g., retention mechanism such as a user's hand). The frame can extend along a single side of the body (e.g., along the bottom of the rotors, along the top of the rotors), along a first and second side of the body (e.g., along the top and bottom of the rotors), encapsulate the rotors (e.g., extend along all sides of the rotors), or be otherwise configured. The frames can be statically mounted or actuatably mounted to the main body.

The frame can include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 1 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The body (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 1. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The aerial system 1 can additionally include inputs (e.g., microphones, cameras, etc.), outputs (e.g., displays, speakers, light emitting elements, etc.), or any other suitable component.

The remote computing system functions to receive auxiliary user inputs, and can additionally function to automatically generate control instructions for and send the control instructions to the aerial system(s) 1. Each aerial system 1 can be controlled by one or more remote computing systems. The remote computing system preferably controls the aerial system 1 through a client (e.g., a native application, browser application, etc.), but can otherwise control the aerial system 1. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component.

4. Method.

Detecting a flight event S110 functions to detect an imminent operation event requiring or otherwise associated with aerial system flight. The imminent operation event can be freefall (e.g., aerial system motion along a first axis parallel a gravity vector), imminent freefall, aerial system arrangement in a predetermined orientation (e.g., arrangement with a major aerial system plane within a predetermined range from perpendicular to a gravity vector for a predetermined amount of time, such as 0.5 s), manual support of the aerial system in mid-air (e.g., based on the acceleration patterns, rotation patterns, vibration patterns, temperature patterns, etc.), or be any other suitable imminent operation event. S110 preferably includes detecting a change in a sensor signal associated with imminent operation. The change is preferably detected by the processing system based on signals received from the on-board sensors (e.g., orientation sensors), but can alternatively be detected by the remote computing system (e.g., wherein the sensor signals are transmitted to the remote computing system), or detected by any other suitable system. The predetermined change can be set by a manufacturer, received from the client running on the remote computing system, received from a user, or otherwise determined. The change can be determined: at a predetermined frequency, every time a new orientation sensor signal is received, or at any other suitable time. The predetermined change can be a signal change, a parameter change (e.g., amount of acceleration change, velocity change, etc.), a rate of change (e.g., rate of acceleration change), or be any other suitable change.

The change indicative of imminent operation can be received from a user, received from the client, automatically learned (e.g., based on a trained learning set of labeled accelerometer patterns), or otherwise determined. The actual change can be considered a change indicative of imminent operation if the actual change substantially matches the predetermined change indicative of imminent operation, is classified as a change indicative of imminent operation, substantially matches a pattern parameter values indicative of imminent operation, or can be otherwise detected.

The orientation sensor signals can be periodically monitored for the predetermined change, wherein monitoring the signals can include temporarily caching a set of prior orientation sensor signals, determining a change between the cached orientation sensor signals and a new orientation sensor signal. However, the orientation sensor signals can be otherwise monitored. In one embodiment (shown in FIG. 3), the predetermined change can be the acceleration (e.g., proper acceleration) or a component of the acceleration (e.g., along an axis associated with a gravity vector) becoming substantially equal to zero (e.g., less than 0.1 g, less than 0.3 g, less than a threshold fraction of a typical acceleration observed in the aerial system, such as 10% or 30%, etc.), dropping toward zero, dropping toward zero beyond a threshold rate, or exhibiting any other suitable absolute change, pattern of change, or other change indicative of freefall. The axis associated with a gravity vector can be an axis parallel the gravity vector, a predetermined aerial system axis and/or orientation sensor axis (e.g., a central axis perpendicular to a lateral plane of the aerial system), or be any other suitable axis. In a specific example, detecting the flight event S110 includes detecting a proper acceleration substantially equal to zero at an accelerometer mounted to the aerial system body.

In a first variation of this embodiment, the axis can be the axis perpendicular the bottom of the aerial system (e.g., bottom of the aerial system housing). In a second variation, the aerial system can automatically identify the axis parallel the gravity vector. This can include identifying the axis for which a measured acceleration that is substantially the same as or higher than the magnitude of gravity acceleration was measured (e.g., for a predetermined period of time). In this variation, upon determination that the predetermined change has occurred, the method can additionally include analyzing the sensor measurements from other axes to determine whether the aerial system is truly in freefall (e.g., wherein the measurements from other axes are less than the gravity acceleration magnitude) or has simply been rotated (e.g., wherein the measurements from one or more other axes is more than or equal to the gravity acceleration magnitude). Additionally or alternatively, in this variation, the method can include correlating the acceleration measurements with disparate orientation information (e.g., measurements from one or more sensors such as a gyroscope or camera). The method can optionally selectively ignore or not consider measurements for certain axes (e.g., longitudinal axis of the aerial system). However, the axis can be otherwise determined, or no single axis may be used (e.g., instead relying on a total magnitude).

In a second embodiment (shown in FIG. 4), altimeter signals can be periodically monitored for a predetermined change. The predetermined change can be a predetermined decrease in altitude, a predetermined rate of altitude change, or be any other suitable change.

In a third embodiment, accelerometer and/or gyroscope signals can be periodically monitored for an indication that the aerial system is being supported in a substantially horizontal orientation (e.g., an axis perpendicular the bottom of the aerial system is within a threshold angle from a gravity vector, such as 1°, 5°, 10° or 15°). In one example, the flight event is detected S110 when the spatial sensor signals indicate that the aerial system has been supported substantially horizontally for greater than a threshold time (e.g., 100 ms, 350 ms, 1 s, 2 s, 5 s, etc.) while the aerial system is in a standby state and the sonar and optical sensors are sampling valid data for flight control. However, the change indicative of imminent operation can be otherwise determined.

Operating the aerial system in a flight mode S120 functions to fly the aerial system. S120 preferably includes operating the lift mechanism in a flight mode, but can additionally or alternatively include operating any other suitable aerial system components in a flight mode. The aerial system is preferably automatically operated by the processing system, but can alternatively be automatically operated by the remote computing system or by any other suitable system. The aerial system is preferably operated in a flight mode S120 automatically in response to detecting the flight event S110, but can additionally or alternatively be operated after a predetermined time duration has passed after the flight event is detected S120, after the aerial system altitude has changed beyond a predetermined altitude change (e.g., as determined from the altimeter), or at any other suitable time. The aerial system is preferably operated according to a set of operation parameters, wherein the operation parameters can be predetermined, selected (e.g., based on the sensor measurement combination at the time of or preceding change detection; based on the classification of the sensor measurement patterns or combination; etc.), or otherwise determined. The operation parameters can include: power provided to the lift mechanism (e.g., voltage, current, etc.), lift mechanism speed or output, timing, target sensor measurements, or any other suitable operation parameter.

The aerial system can operate in the flight mode using signals from: a front-facing camera, a downward-facing camera, orientation sensors, a laser system (e.g., rangefinder, LIDAR), radar, stereocamera system, time of flight, or any other suitable optical, acoustic, rangefinding, or other system. The aerial system can process the signals using RRT, SLAM, kinematics, optical flow, machine learning, rule-based algorithms, or any other suitable method. In a specific example, the path movement mode includes sampling a series of images with a front-facing camera and automatically determining the aerial system physical position within a 3-D space using the series of images and a location method (e.g., SLAM) running on-board the aerial system. In a second specific example, the path movement mode includes sampling a series of images with a down-facing camera (e.g., sampling at 60 fps, or at any other suitable frequency), automatically detecting apparent movement between the aerial system and the ground based on the sampled images (e.g., using optical flow), which can assist in determining aerial system position or kinematics (e.g., speed, acceleration), and automatically correcting the aerial system balance or position based on the detected apparent movement. In a third specific example, the aerial system location determined using the first specific example and the aerial system kinematics determined using the second specific example can be fed into a flight control algorithm to hover, fly, or otherwise control the aerial system.

The flight mode preferably includes a hover mode in which the aerial system position in the air (e.g., vertical position, lateral position, etc.) is substantially maintained, but can alternatively be any other suitable flight mode. The flight mode preferably includes maintaining an aerial system orientation such that a central axis normal to a lateral plane of the aerial system is substantially parallel to a gravity vector (e.g., within 20°, within 10°, within 3°, within 1°, etc.). However, the central axis can be otherwise maintained. The flight mode preferably includes generating a force at the lift system equal and opposite the force exerted on the aerial system by gravity (e.g., to hover), but can alternatively include generating a vertical force greater or lesser than the gravitational force (e.g., to increase or decrease altitude, and/or to arrest vertical movement and bring the aerial system into a hovering state). The flight mode can additionally or alternatively include generating a non-vertical force and/or a torque (e.g., to change the aerial system pitch or roll, to cause or arrest lateral movement, etc.). For example, the flight mode can include detecting an orientation, position, and/or velocity change, determining that the change is due to wind and/or another external perturbation such as a collision (e.g., classifying the change as a wind and/or collision event, determining a probability of wind perturbation, determining a probability of the perturbation being a grab event, etc.), and operating the lift mechanism to correct for the change and return to an original or desired position, orientation, and/or velocity.

The flight mode can additionally or alternatively include a path movement mode (e.g., flying in a straight line, flying along a predetermined path, etc.), a program mode (e.g., flying along a path determined dynamically based on a flight program, flying based on facial and/or body tracking such as following or orbiting around a person or maintaining the person's face within a camera field of view, etc.), and/or any other suitable mode. The flight mode can optionally include capturing an image (e.g., storing a single image, streaming a video, etc.) using an aerial system camera mounted (or otherwise mechanically coupled) to the body.

The flight mode can additionally or alternatively include an imaging mode, wherein the aerial system automatically identifies an imaging target (e.g., person, face, object, etc.) and controls its flight to automatically follow the imaging target through a physical space. In one variation, the aerial system can run object recognition and/or tracking methods, facial recognition and/or tracking methods, body recognition and/or tracking methods, and/or any other suitable method on the sampled images (e.g., from the front-facing camera) to identify and track the imaging target. In a specific example, the aerial system can automatically image a substantially 360° region about itself (e.g., by rotating about the central axis, by moving the camera around, by using a 360° camera, etc.), automatically identify imaging targets from the image, and automatically follow an imaging target (e.g., automatically identified or manually selected) about the physical space. However, the imaging mode can be otherwise performed. However, the flight mode can include any other suitable set of operation modes.

The aerial system can be operated in the flight mode by independently controlling the angular velocity of each rotor and/or the power delivered to each rotor. However, the rotors can be controlled as a group or in any other suitable manner. S120 preferably includes generating an aerodynamic force at the set of rotors that is substantially equal to the total aerodynamic force generated by the aerial system, more preferably also substantially equal to the net force exerted by the aerial system (e.g., wherein the aerial system does not include any other components configured to generate significant aerodynamic force, or to otherwise exert significant force, such as propulsive force, on the ambient environment).

In one variation, operating the aerial system in the flight mode can include spooling up the rotor angular velocity of each rotor to a flight rotor speed (e.g., at which the set of rotors generates a flight aerodynamic force) from a standby rotor speed (e.g., at which the set of rotors generates a standby aerodynamic force lower than the flight aerodynamic force, such as substantially zero force or a small fraction of the flight aerodynamic force). In this variation, the flight rotor speed is preferably the hover rotor speed at which the aerial system hovers; alternatively the speed can be any other suitable rotation speed. The flight speed can be preset (e.g., by a manufacturer), received from the client, automatically determined (e.g., based on the rate of signal change), or otherwise determined. The standby rotor speed can be low speed (e.g., a proportion of the hover speed), substantially zero angular velocity (e.g., wherein the rotors are not rotating), or have any other suitable speed. The standby rotor speed can be preset (e.g., by a manufacturer), received from the client, or otherwise determined. The rotor speed can be immediately transitioned from the standby rotor speed to the flight rotor speed, transitioned based on the rate of orientation sensor signal change, transitioned at a predetermined rate, or transitioned in any other suitable manner.

Figure 7:
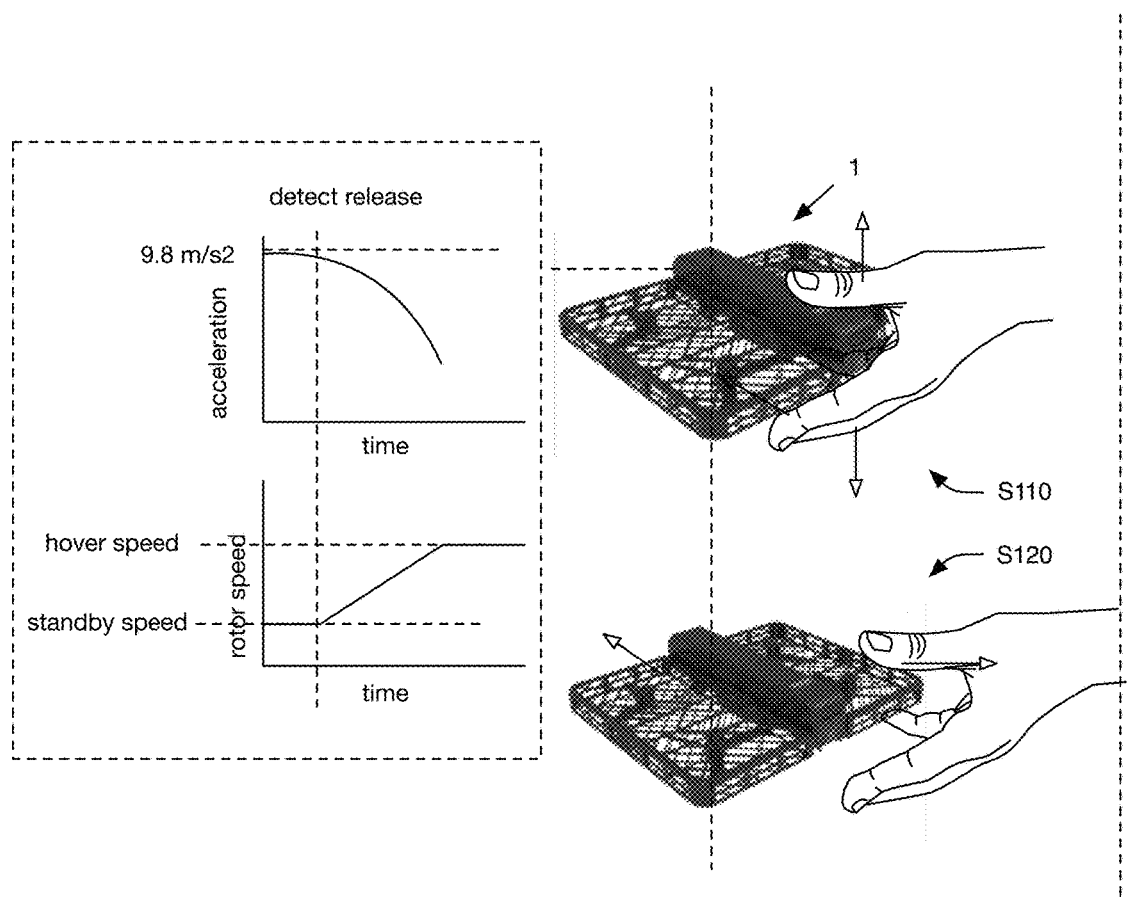
FIG. 7 is a schematic representation of a first variation of automatic aerial system operation, including a specific example of the detected sensor signal change indicative of freefall and a specific example of lift mechanism control in response to the detected sensor signal change.
Figure 9:
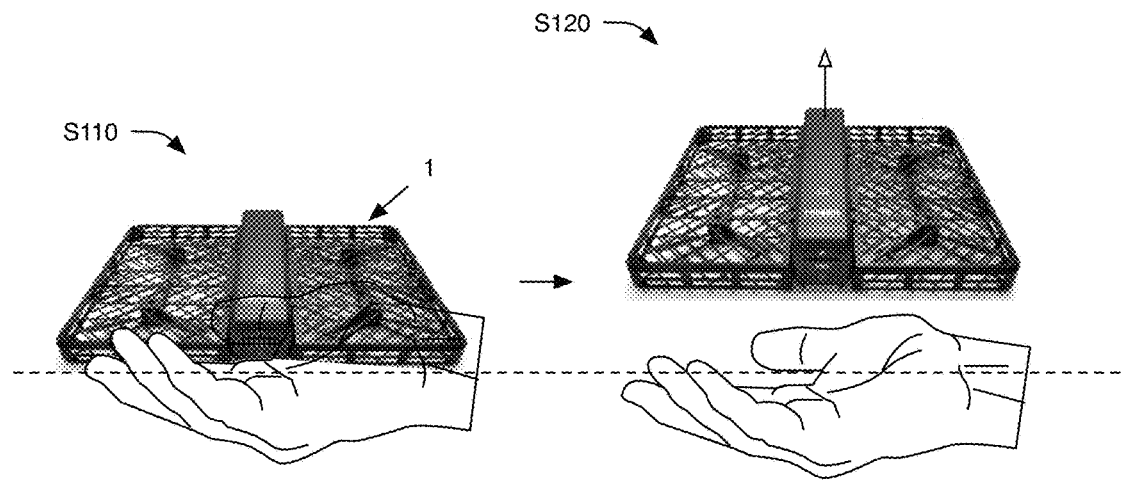
FIG. 9 is a schematic representation of a third variation of automatic aerial system operation, in which the aerial system automatically lifts off a support surface.
Figure 10:
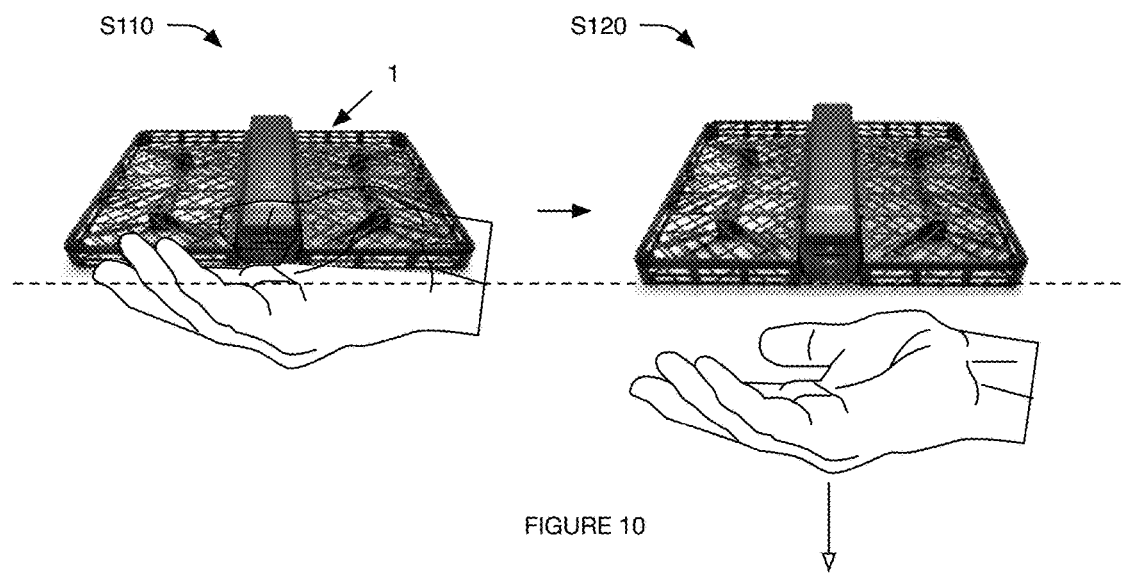
FIG. 10 is a schematic representation of a fourth variation of automatic aerial system operation, in which the aerial system automatically hovers upon removal of a support surface.

In a first example, the rotation speed is first increased to a speed above the hover speed, then lowered to the hover speed, such that the aerial system ceases freefall and hovers after freefall is detected. This can function to prevent the aerial system from freefalling when a support surface is suddenly removed (shown in FIG. 10). In a second example, the rotation speed can be proportionally related to the rate of acceleration change. In a specific example, the rotation speed can be faster than the hover speed when the acceleration change exceeds that associated with freefall (e.g., when the aerial system is thrown down). This can function to enable the aerial system to recover faster and/or recover an initial altitude (e.g., measured before or when the change was detected). In a second specific example, the rotation speed can be increased proportionally to the amount of acceleration change. In operation, this causes the rotors to gradually spool up as the aerial system is gradually released by the user (shown in FIG. 7). In a third specific example, the rotor speed can increase at a predetermined rate. In operation, this causes the rotors to gradually spool up, slowly lifting the aerial system away from a support surface, such as a user's hand (shown in FIG. 9). In this specific example, the method can additionally include switching to the first example when the support surface is suddenly removed (e.g., as determined from a sudden change in the orientation sensor signal). The rotation speed can optionally be limited to prevent or minimize wake effects. However, the lift mechanism can be otherwise operated in response to detection of the change.

The method can optionally include monitoring sensor signals associated with a second axis and determining the lift mechanism operation parameters (for lift mechanism operation in response to imminent operation detection) based on the sensor signals for the second axis. This can function to select lift mechanism operation parameters that enable the aerial system traverses a distance along the second axis before halting and hovering. The second axis is preferably different from the axis substantially parallel to the gravity vector (e.g., perpendicular the axis substantially parallel to the gravity vector, at a non-zero angle to the axis, etc.), but can alternatively be the same. The axes can be fixed with respect to the aerial system, or can be dynamically transformed (e.g., to attempt to fix the axes with respect to gravity and/or the ambient environment, possibly based on measurements sampled by the accelerometer, gyroscope, camera, and/or any other suitable sensors). The sensor signals for the second axis that are considered in determining the lift mechanism operation parameters can be sensor signals acquired concurrently with the sensor signals for the first axis, before the imminent operation change is detected, after the imminent operation change is detected (e.g., in response to change detection), or at any other suitable time. The distance can be predetermined, determined based on time (e.g., the aerial system can traverse along the second axis for is after release), determined based on the amount of applied force, or be determined in any other suitable manner.

Figure 8:
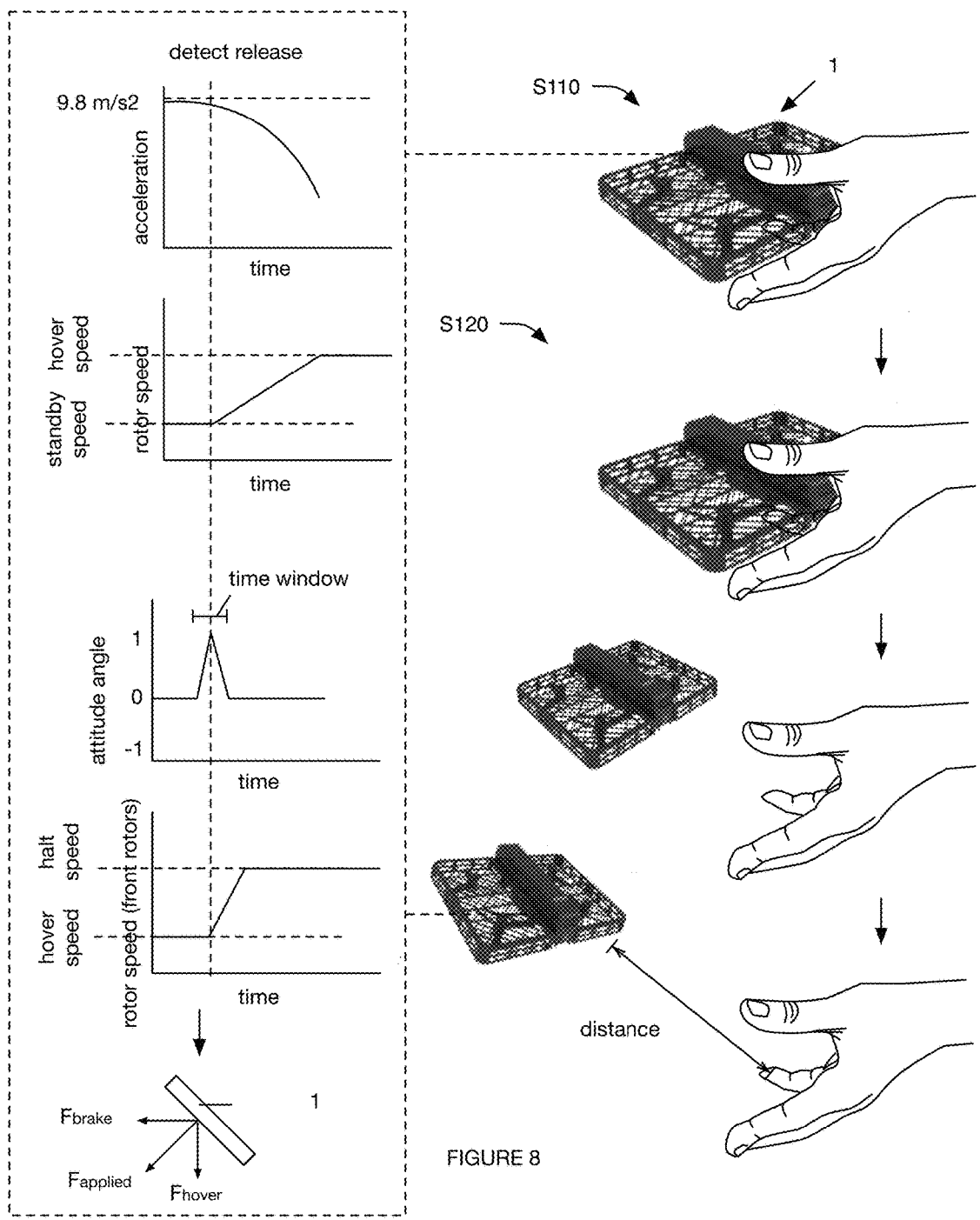
FIG. 8 is a schematic representation of a second variation of automatic aerial system operation including detection of an applied force along a second axis, further including a specific example of the detected sensor signal change indicative of freefall and a specific example of lift mechanism control in response to the detected sensor signal change.

In one variation, shown in FIG. 8, the second axis can be parallel the longitudinal axis of the body (e.g., intersect the camera field of view). In response to detecting force application along the second axis (e.g., within a time window of change detection), the aerial system can automatically determine lift mechanism operation instructions to counteract the applied force. This can function to allow the aerial system to travel a predetermined distance along the second axis before ceasing further traversal. Force application and/or applied force magnitude can be determined from an orientation sensor monitoring the second axis (e.g., the accelerometer for the second axis), determined from a force sensor arranged along an aerial system surface perpendicular the second axis, or otherwise determined. The applied force to be counteracted can be the instantaneous force in the second axis at the time the predetermined condition is met, the applied force measured within a time window of imminent operation event detection (e.g., the maximum force, minimum amount of force, etc.), the applied force measured concurrent with imminent operation event detection, or be any other suitable force measured at any other suitable time. In one example, the lift operation instructions can include spooling up the rotors to hover the aerial system immediately after imminent operation event detection, allowing the aerial system to coast using the applied force for a predetermined period of time after imminent operation event detection, controlling the lift mechanisms to cease further traversal along the second axis (or any axis) after a predetermined condition has been met, and controlling the lift mechanisms to hover the aerial system (e.g., controlling the lift mechanisms to operate at hover speed). In a second example, the lift operation instructions can include determining the resultant aerial system speed or acceleration along the second axis due to the applied force, spooling up the rotors to maintain the aerial system speed or acceleration along the second axis immediately after imminent operation event detection until a predetermined condition has been met, controlling the lift mechanisms to cease further traversal along the second axis (or any axis) upon satisfaction of the predetermined condition, and controlling the lift mechanisms to hover the aerial system (e.g., controlling the lift mechanisms to operate at hover speed). The predetermined condition can be imminent operation event detection (e.g., wherein the instructions are implemented immediately after imminent operation event detection), within a threshold period of time after imminent operation event detection, after a predetermined condition is met after imminent operation event detection (e.g., after a predetermined distance has been traversed, after a predetermined amount of time has passed, etc.), or at any other suitable time. In one example, the predetermined condition can be selected based on the magnitude of applied force (e.g., acceleration magnitude, etc.). The magnitude of the applied force can be the magnitude of the force applied along the second axis, the total magnitude of the force applied to the system (e.g., less the force applied by gravity), or be otherwise determined.

In a first specific example, the instruction execution delay can be proportional to the amount of applied force, such that the aerial system flies further before halting further aerial system traversal along the second axis when larger forces are applied upon aerial system release. In a second specific example, the instruction execution delay can be inversely proportional to the amount of applied force, such that the aerial system flies a shorter distance before halting when larger forces are applied upon aerial system release. However, the aerial system can be otherwise operated based on sensor signals for the second axis.

The method can optionally include monitoring sensor signals associated with aerial system altitude and determining the lift mechanism operation parameters based on the altitude. In one variation, this can function to select lift mechanism operation parameters to regain an initial aerial system altitude (e.g., compensate for any altitude losses due to freefall prior to recovery). The altitude can be determined based on signals sampled by an altimeter, and/or a relative altitude can be determined based on image analysis, range finding (e.g., using a vertically-oriented rangefinder to determine distance to the ground, floor, and/or ceiling). The altimeter signals (and/or other altitude data) that are considered in determining the lift mechanism operation parameters can be altimeter signals acquired concurrently with the sensor signals for the first axis, before the imminent operation change is detected, after the imminent operation change is detected (e.g., in response to change detection), or at any other suitable time. For example, the method can include determining the initial aerial system altitude within a predetermined time window from imminent operation event detection (e.g., prior to imminent operation event detection, based on altimeter measurements recorded prior to imminent operation event detection), spooling up the rotors to hover the aerial system immediately after imminent operation event detection, and increasing the rotor speed until the aerial system reaches the initial aerial system altitude after the aerial system is stabilized. However, the altimeter signals (and/or other altitude data) can be used in any other suitable manner.

Receiving a control instruction S130 can function to enable a user to augment and/or override automatic aerial system operation. The control instruction is preferably received during aerial system flight, but can additionally or alternatively be received before flight and/or at any other suitable time. The processing system preferably receives the control instructions, but any other suitable system can receive the control instructions. The control instructions are preferably received from a user, user device, remote controller, and/or client (e.g., running on a user device) associated with the aerial system, but can alternatively be received from a location associated with the aerial system (e.g., from a device at the location), sensors on-board the aerial system (e.g., interpreting hand or body signals), and/or from any other suitable system. The user can be recognized by the aerial system (e.g., through optical recognition, such as facial or body recognition), can be near the aerial system (e.g., within range of the aerial system sensors), can be otherwise associated with the aerial system, or can be any suitable user. The user device and/or client can be paired with the aerial system (e.g., through a Bluetooth connection, dynamically paired upon aerial system startup, paired at the manufacturing facility, etc.), have a complementary security key pair for the aerial system, be associated with the same user account as the aerial system, or be otherwise associated with the aerial system. The control instructions can be generated by the user, generated by the user device or client (e.g., in response to user input receipt), generated by a device at the location associated with the aerial system, determined based on a characteristic of the control instruction sender (e.g., location appearance characteristic, ambient environment audio characteristic, etc.), generated by the aerial system, and/or generated or determined in any other suitable manner.

In one variation, the control instructions can include a landing instruction. In a first embodiment, S130 includes determining a landing area (e.g., automatically identifying the landing area). This can be performed wholly or partially by the processing system, remote computing system, or any other suitable system. The landing area can be automatically determined based on aerial system sensor measurements, be received from the control instruction sender, be user-specified (e.g., at the client), or be otherwise determined.

In a first variation of this embodiment, a retention mechanism (e.g., human hand, docking station, capture device, etc.) is determined to be the landing area, based on the position, type, and/or conformation of the retention mechanism. This variation preferably includes optically detecting (e.g., using image recognition techniques, classification techniques, regression techniques, rule-based techniques, pattern-matching techniques, etc.) the retention mechanism position, type, and/or conformation, but can additionally or alternatively include determining the position, type, and/or conformation in any other suitable manner.

Figure 12:
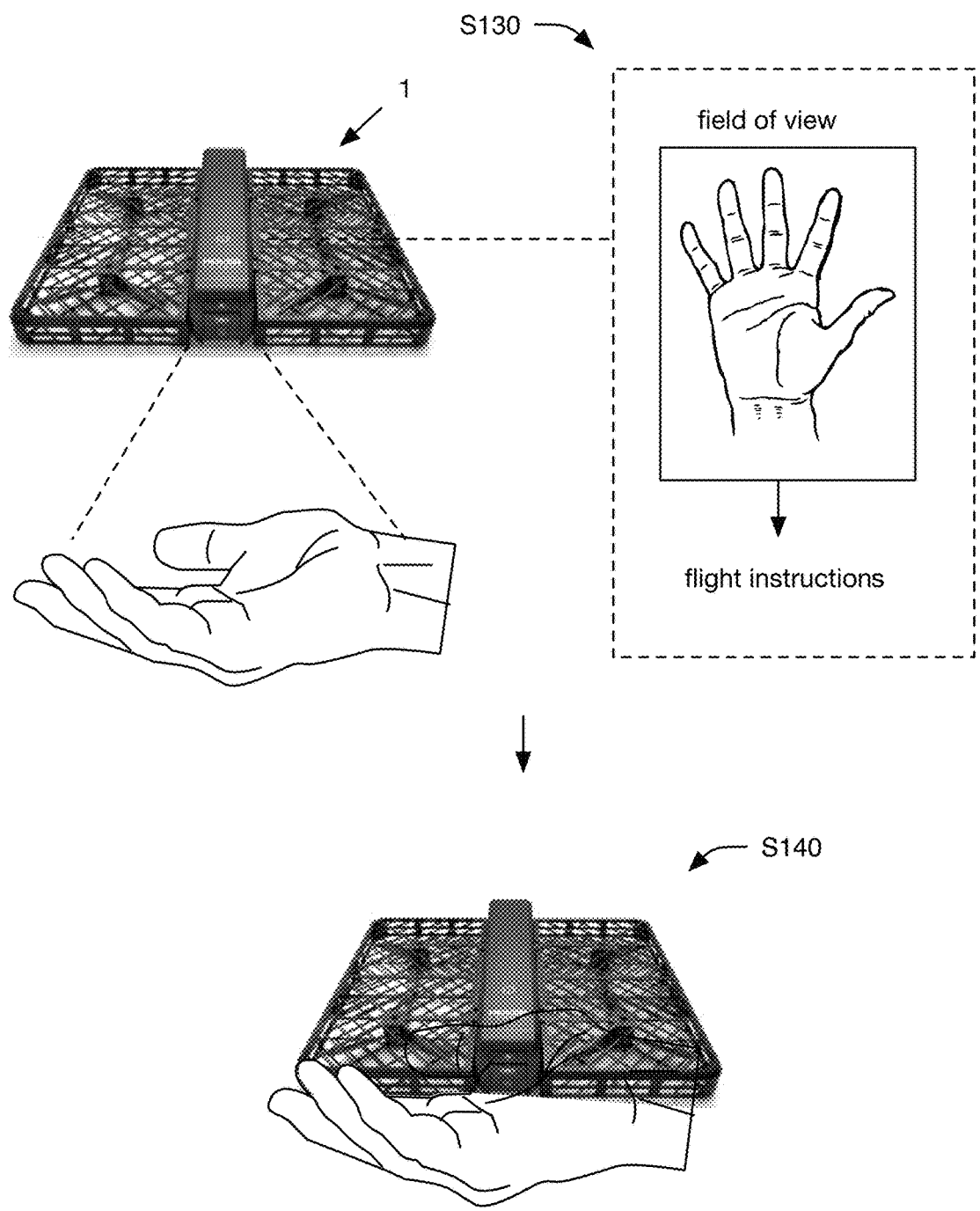
FIG. 12 is a schematic representation of a second variation of detecting a standby event and operating the aerial system in a standby mode, including detecting an open user hand underneath the aerial system as the standby event.
Figure 13:
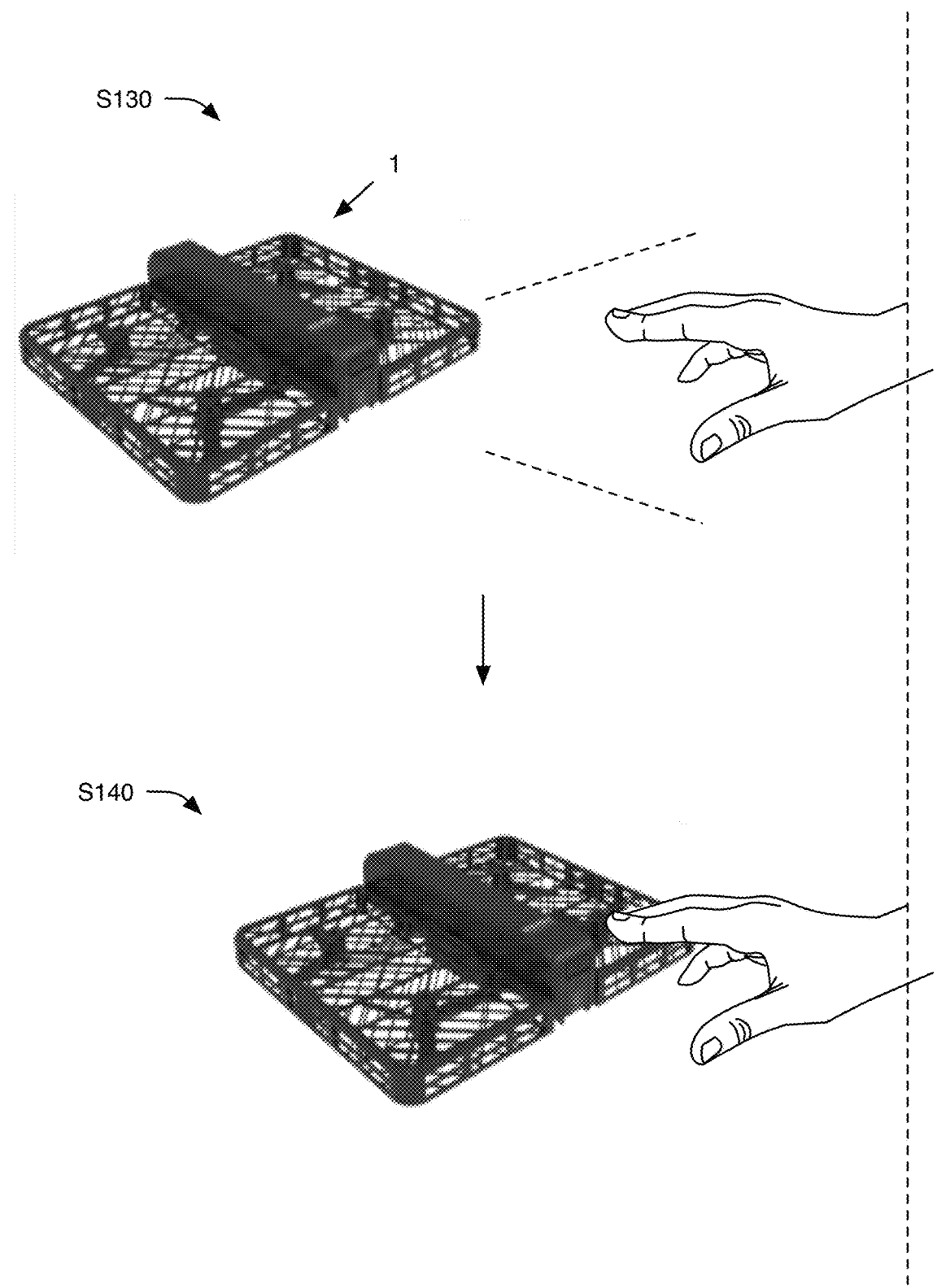
FIG. 13 is a schematic representation of a third variation of detecting a standby event and operating the aerial system in a standby mode, including detecting a user hand in a "ready-to-grab" conformation to the side of the aerial system as the standby event.

For example, the retention mechanism can be a human hand. In a first specific example, the landing area is an open hand detected using images from the downward facing camera (e.g., as shown in FIG. 12). In a second specific example, the landing area is a hand in a "ready-to-grab" conformation (e.g., as shown in FIG. 13). In a third specific example, the landing area is a hand making a beckoning gesture.

This variation can include: periodically analyzing (e.g., using visual analysis techniques, image analysis techniques, etc.) sensor data such as images captured by aerial system cameras (e.g., arranged along the top, side, and/or bottom of the aerial system) for a retention mechanism in a predetermined conformation type (e.g., open hand, "ready-to-grab" hand, etc.), and identifying the retention mechanism as a landing area in response to detection of parameters indicative of the predetermined conformation type.

In a first example, the method can include: sampling a set of infrared images, identifying a region within the image having an infrared signature above a threshold value, and determining that the identified region is a hand (e.g., using pattern matching, deterministic methods, classification, regression, probabilistics, etc.). For example, the identified region can be determined to be a hand when the region perimeter substantially matches a reference pattern for a hand. In a second example, the method can include: sampling a set of visual range images, segmenting the image background from the foreground, and determining that the foreground region is a hand (e.g., using methods discussed above). However, a human hand can be otherwise identified.

This variation can optionally include: identifying a user hand from images (e.g., recorded by a downward facing camera) and identifying the hand as a landing area in response to recognizing the hand as a specific user's hand (e.g., using classification techniques, regression techniques, biometric data such as fingerprints, etc.) associated with the aerial system. For example, extracted biometric data can be compared with biometrics can be stored on the aerial system, in the user device, or in a remote database, wherein the user can be rejected if the biometric data does not match beyond a threshold percentage, and accepted if the biometric data matches beyond the threshold percentage. This embodiment can optionally include ignoring commands received from a hand (e.g., identifying the hand as a non-landing area) when the detected hand is not associated with a user associated with the aerial system.

In a second variation, the landing area can be a substantially flat surface (e.g., perpendicular a gravity vector) proximal the aerial system (e.g., identified based on based on visual and/or image processing of images recorded by a front facing or downward facing camera, identified by a beacon near the landing area, specified by an instruction received from a user device, etc.). In a third variation, the landing area can be a predetermined docking area (e.g., a home base, identified by an optical pattern, beacon signal, predetermined geographic location, or otherwise identified). However, the landing area can be any other suitable landing area and/or can be otherwise determined.

In a second embodiment, the landing instruction includes a time and/or time period. For example, the landing instruction can include a time to land, a desired flight duration (e.g., measured from the flight event detection time, from the stabilization time, from the landing instruction receipt time, etc.), and/or any other suitable timing information.

Additionally or alternatively, the control instruction can include a flight instruction (e.g., speed, altitude, heading, flight pattern, target destination, collision avoidance criteria, etc.), a sensor instruction (e.g., begin video streaming, zoom camera, etc.), and/or any other suitable instruction.

Operating the aerial system according to the control instruction S140 functions to carry out the control instruction. S140 is preferably performed automatically in response to receiving the control instruction S130, but can additionally or alternatively be performed at any suitable time after receiving the control instruction S130. The processing system preferably operates the lift mechanisms and/or other aerial system modules based on the control instructions, but additionally or alternatively, any other suitable system can operate the aerial system. In a first variation, the control instructions override the automatic flight instructions. In a second variation, the control instructions are augmented by the automatic flight instructions (e.g., wherein the processor generates a tertiary set of flight instructions based on the automatic flight instructions determined based on the sensor data and the received control instructions). In a third variation, the control instructions are executed after a predetermined flight state has been reached. In one example of the third variation, the control instructions are executed after the aerial system has stabilized (e.g., has substantially ceased traversal and/or is hovering). However, the control instructions can be executed at any suitable time in any suitable manner. After performing S140, the aerial system can resume operating in a previous mode (e.g., the operation mode immediately before performing S140, such as a hover mode), can begin operation in a different flight mode, can enter a standby mode, and/or can operate in any other suitable mode.

In a first embodiment, the control instruction includes a flight instruction, and S140 can include operating according to the flight instruction. For example, in response to receiving a command to increase altitude and pan left, S140 can include automatically operating the lift mechanism to follow the instructions, and then to resume aerial system hovering in the new position. In a second example, in response to receiving a command to increase rotor speed, S140 can include increasing the rotor speed accordingly.

In a second embodiment, the control instruction is a landing instruction including a landing area, and S140 can include automatically generating a flight path to the landing area, generating lift mechanism operation instructions to follow the generated flight path, and executing the instructions. This can function to automatically land the lift mechanism. The flight path can be generated based on the intervening physical volume between the aerial system and the landing area (e.g., as determined based on visual and/or image processing of images recorded by a front facing or downward facing camera), be a predetermined flight path, or otherwise determined. In one example, determining the flight path and/or lift mechanism operation instructions includes: determining the distance between the aerial system and the landing area (e.g., based on LIDAR, the relative size of a reference object or point within the field of view, etc.), and determining a rotor spool down rate based on the instantaneous rotor speed, the standby rotor speed, and the distance. In a second example, determining the flight path and/or lift mechanism operation instructions includes tracking the landing area (e.g., to track flight progress toward the landing area, to track the current position of a moving landing area, etc.) and automatically controlling the aerial system to land on the landing area. However, the lift mechanism operation instructions can be otherwise generated.

In a first specific example, in which the landing area is an open hand, S140 includes automatically controlling the aerial system to land on the open hand (e.g., operating the lift mechanism, such as by reducing the rotor speeds, to slowly lower the aerial system onto the open hand) in response to detecting the open hand. In a second specific example, in which the landing area is a "ready-to-grab" hand, S140 includes automatically controlling the aerial system to fly proximal the hand (e.g., within reach of the hand, in contact with the hand, within a threshold distance of the hand, such as 1 in, 3 in, or 1 foot, etc.) in response to detecting the hand (e.g., immediately after detecting the hand, a period of time after detecting the hand, before detecting a standby event S150 and/or operating in a standby mode S160, etc.). However, the aerial system can be operated according to the control instruction S140 in any suitable manner.

Detecting a standby event S150 functions to indicate that the aerial system should commence a standby procedure. The standby event (e.g., flight cessation event) is preferably detected while the aerial system is operating in a flight mode (e.g., hover mode, landing mode, etc.), but can additionally or alternatively be detected while the aerial system is operating in any other suitable mode and/or at any other suitable time. The standby event is preferably detected by the processing system (e.g., of the aerial system), but can alternatively be automatically detected by the remote computing system, the user device, or by any other suitable system.

Detecting the standby event S150 preferably includes detecting a grab indication (e.g., indication that the aerial system has been captured or seized by a retention mechanism such as a human hand) and/or holding indication (e.g., indication that the aerial system is in prolonged contact with a user, indication that the aerial system is docked at a docking station, etc.), and can additionally or alternatively include detecting a landing indication (e.g., indication that the aerial system has landed on and/or is supported by a landing area), proximity indication (e.g., user proximity, landing area proximity, etc.), and/or any other suitable standby indication. The standby event is preferably detected based on data sampled by sensors, more preferably on-board aerial system sensors (e.g., inertial measurement unit, camera, altimeter, GPS, temperature sensor, etc.). For example, the standby event can be detected based on the value and/or change in value of the aerial system's: orientation (e.g., orientation with respect to gravity, orientation change and/or rate of change, etc.), altitude (e.g., altitude change and/or rate of change; determined based on altimeter readings, image processing, etc.), temperature (e.g., increasing aerial system temperature, temperature difference between regions of the aerial system, etc.), and/or force (e.g., aerial system compression). However, the standby event can additionally or alternatively be detected based on transmissions (e.g., from a remote control such as a client of a user device) and/or any other suitable information.

The standby event can be detected using classification, regression, pattern matching, heuristics, neural networks, and/or any other suitable techniques. Monitoring and analyzing data to detect the standby event preferably includes discriminating between standby events (e.g., grab events, etc.) and other events (e.g., wind events, collision events, etc.). For example, the method can include monitoring aerial system sensor data while operating in a flight mode, detecting a first anomalous event and classifying it as a wind event (e.g., flight disturbance due to wind), then detecting a second anomalous event and classifying it as a grab event.

Figure 11:
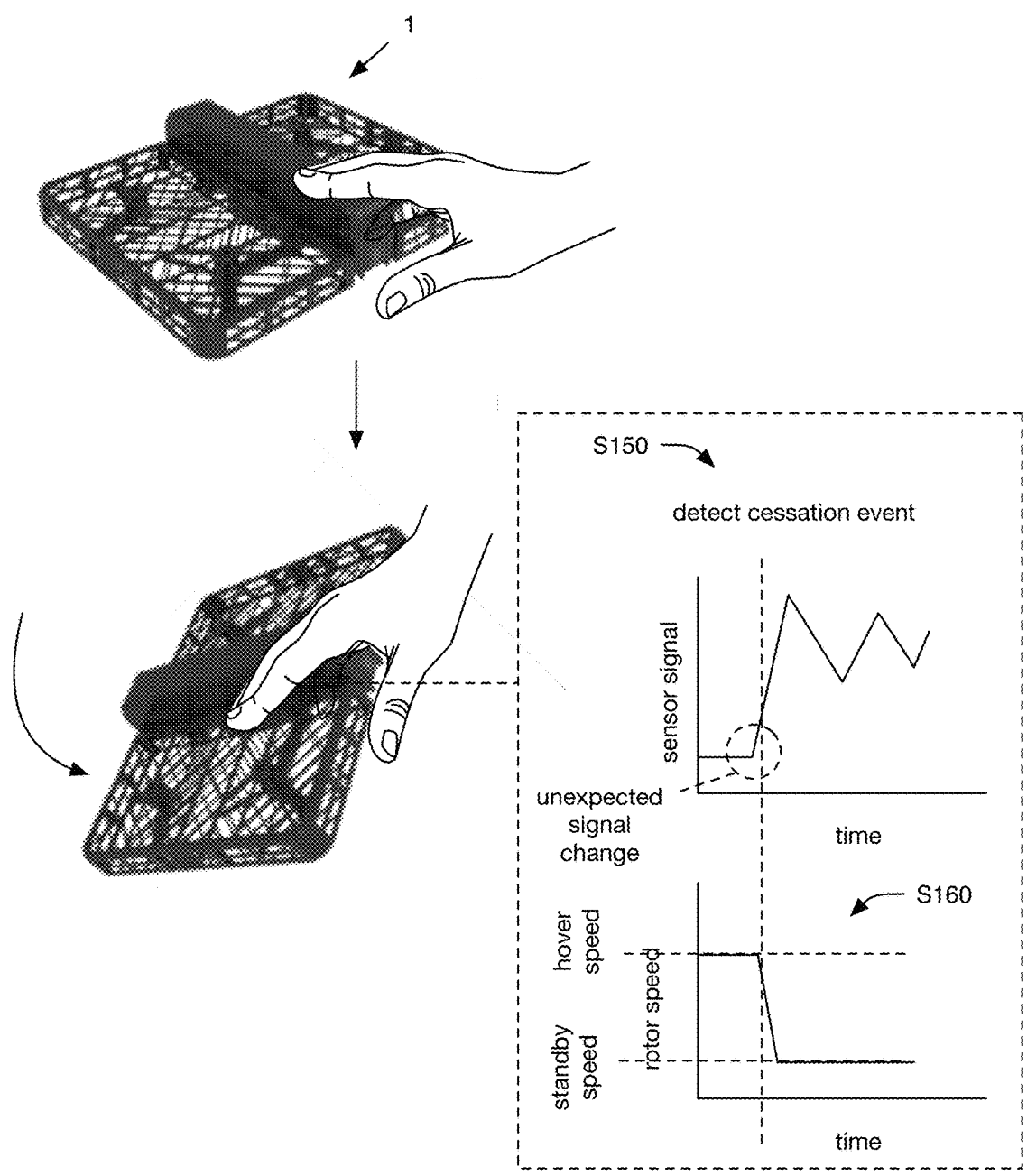
FIG. 11 is a schematic representation of a first variation of detecting a standby event and operating the aerial system in a standby mode, including a specific example of the detected unexpected sensor signal change and a specific example of lift mechanism control in response to the detected standby event.

In a first variation, detecting the standby event S150 includes detecting an unexpected spatial sensor signal change. The unexpected spatial sensor signal change can be indicative of a user grabbing the aerial system mid-flight or mid-air, or be indicative of any other suitable event. The unexpected spatial sensor signal change can be a change relative to another spatial sensor signal (e.g., previous signal from the spatial sensor, previous or concurrent signal from a different spatial sensor, etc.), change relative to an expected spatial sensor signal (e.g., corresponding to a target or desired aerial system orientation, velocity, and/or other spatial parameter, based on lift mechanism control, etc.), and/or any other suitable spatial sensor signal change. In a first embodiment of this variation, detecting an unexpected spatial sensor signal change includes detecting a spatial sensor signal change (e.g., gyroscope signal change, accelerometer change, IMU change, altimeter change, etc.) different from expected spatial sensor signals determined based on automatically generated and/or remotely received control instructions. In a first example of this embodiment, a sensor fusion model (e.g., model including an extended Kalman filter, neural network model, regression model, classification model, etc.) can be used to detect the standby event based on the sensor signals. In a second embodiment of this variation, detecting unexpected spatial sensor signal change includes detecting a spatial sensor signal change (e.g., an IMU change) above a predetermined threshold value. The spatial sensor signal can be indicative of acceleration along an axis, velocity along an axis, angular change (e.g., yaw, pitch, roll, etc.), or be indicative of any other suitable aerial system motion and/or position. In a first example of this embodiment (shown in FIG. 11), the unexpected orientation sensor signal change is detected when the aerial system pitch exceeds a threshold rate of change or threshold angular change (e.g., as determined from accelerometer and/or gyroscope signals). In a second example of this embodiment, a first unexpected spatial sensor signal change below the predetermined threshold value is not recognized as a standby event, but rather as a wind perturbation event, and the lift mechanism is controlled to correct for the wind perturbation. In this second example, a second unexpected spatial sensor signal change is above the predetermined threshold value, and is recognized as a standby event. In a third example of this embodiment, the standby event is detected S150 based on a combination of an unexpected spatial sensor signal change above the predetermined threshold value and a supplementary signal (e.g., temperature exceeding the ambient environment temperature by a threshold amount, compressive force on the aerial system body exceeding a threshold force, etc.). In a fourth example of this embodiment, the standby event is detected S150 when a pattern of spatial sensor signal change substantially matches a predetermined pattern associated with the standby event and/or does not substantially match predetermined patterns associated with other flight events (e.g., wind perturbation). However, the standby event can be otherwise detected.

In a second variation, detecting the standby event S150 includes determining that the aerial system has remained within a threshold angular range from a gravity vector and/or expected orientation vector (e.g., tilted from horizontal and/or from an expected aerial system orientation by more than 35°, 45°, 60°, etc.) for a predetermined period of time (e.g., greater than 100 ms, 350 ms, 1 s, 2 s, etc.). For example, the standby event can be detected when the aerial system (e.g., major plane of the aerial system) has been tilted more than 45° from horizontal and/or from the target aerial system orientation for more than 1 second. However, the standby event can be otherwise detected.

In a third variation, detecting the standby event S150 includes detecting user and/or retention mechanism proximity to the aerial system (e.g., indicative of a user grabbing the aerial system mid-air, etc.). User and/or retention mechanism proximity can be detected using the aerial system's proximity sensor, touch sensor, temperature sensor (e.g., an increase in temperature), communications module (e.g., when a short-range connection is established between the aerial system and user device), switches, or otherwise detected. For example, S150 can include detecting an actuation of a switch mechanically coupled to the housing. The switch can be a button (e.g., button located conveniently for the retention mechanism, such as on the top or bottom housing surface, proximal a housing perimeter, or under a fingertip when the aerial system is held by a human hand), electrical contacts on the body exterior that can be electrically connected by a conductive element of the retention mechanism, and/or any other suitable switch.

In a fourth variation, detecting the standby event S150 includes receiving an instruction (e.g., standby instruction) from a remote control (e.g., user device). However, the standby event can be detected S150 in any other suitable manner.

Operating the aerial system in a standby mode S160 functions to suspend aerial system flight control. The aerial system is preferably operated in the standby mode S160 automatically in response to detecting the standby event S150 (e.g., immediately after detecting the standby event S150, a predetermined time period after detecting the standby event S150, after detecting the standby event S150 and fulfilling additional criteria, etc.). S160 is preferably performed by the aerial system processor, but can additionally or alternatively be performed by other aerial system components, a remote computing system, a user device, and/or any other suitable device.

S160 preferably includes reducing the aerodynamic force generated by the lift mechanism to a force less than the force required for aerial system flight (e.g., reduced to zero force; to a fraction of the required force, such as 1%, 5%, 10%, 50%, 75%, 1-10%, 5-25%, etc.; to just below the required force; etc.). In a variation in which the lift mechanism includes a set of rotors, the rotors can be stopped or unpowered (e.g., controlled to rotate at zero or minimal angular velocity, provided zero or minimal power by the motors that drive them, etc.), can rotate at a slower angular velocity than when in the flight mode (e.g., a fraction of the flight mode angular velocity or minimum angular velocity required for flight, such as 1%, 5%, 10%, 50%, 75%, 1-10%, 5-25%, etc.), can be otherwise altered to cooperatively generate less aerodynamic force than when in the flight mode (e.g., rotor blade angle decreased), and/or can be controlled in any other suitable manner. For example, operating each of rotor of the set of rotors to cooperatively generate an aerodynamic force less than the flight mode aerodynamic force can include reducing power provided to each rotor to less than a power threshold required for aerial system flight (e.g., a fraction of the required power, such as 1%, 5%, 10%, 50%, 75%, 1-10%, 5-25%, etc.). Additionally or alternatively, the aerodynamic force generated by the lift mechanism can be reduced, but not below the force required for aerial system flight, can remain unreduced, or can be changed in any other suitable way.

Aerial system components other than the lift mechanism preferably continue to operate in the standby mode, but can alternatively be turned off (e.g., unpowered), operated in a standby state, or otherwise operated. For example, the sensors and processor can continue to detect and analyze aerial system operation parameters and/or determine the aerial system operation status (e.g., spatial status, flight status, power status, etc.), and the communication system can continue to transmit data (e.g., video stream, sensor data, aerial system status, etc.) from the aerial system (e.g., to a user device, remote computing system, etc.). Continuing to detect and analyze aerial system status can enable the system to detect a flight event S110 while operating in the standby mode S160. For example, this enables repetition of the method (e.g., re-entering a flight mode, etc.) when the aerial system is released after being grabbed and retained (e.g., and entering a standby mode in response). In addition, this can enable flight mode recovery when an event is incorrectly identified as a standby event. In a specific example, in which a wind perturbation or collision with an object is misidentified as a grab event, the aerial system can enter the standby mode and begin to freefall (as it is not actually supported by a retention mechanism). In this specific example, the freefall can then be detected, and the aerial system can resume operation in the flight mode S120 in response to freefall detection. Alternatively, operating the aerial system in the standby mode S160 can include turning off and/or reducing the power consumption of any or all of the other aerial system components, operating the aerial system components at any suitable power consumption level in any suitable manner, and/or S160 can be performed in any other suitable manner.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for controlling an aerial system comprising a rotor, the method comprising:
    operating the rotor in a flight mode, wherein the rotor is enclosed by a housing of the aerial system and configured to rotate about a rotor axis;

while operating the rotor in the flight mode, detecting a grab event indicative of the aerial system being grabbed; and at a processor mounted to the housing of the aerial system, in response to detecting the grab event, automatically operating the rotor in a standby mode, wherein operating the rotor in the standby mode comprises ceasing rotor rotation.

2. The method of claim 1, further comprising detecting a start event indicative of aerial system free-fall, wherein the flight mode is a hover mode and wherein operating the rotor in the hover mode is performed automatically in response to start event detection.

3. The method of claim 2, further comprising, while operating the rotor in the hover mode, capturing an image with a camera mounted to the housing.

4. The method of claim 1, further comprising:
while operating the rotor in the flight mode, optically detecting a retention mechanism; and
at the processor, in response to detecting the retention mechanism and before detecting the grab event, automatically controlling the aerial system to fly proximal the retention mechanism.

5. The method of claim 1, wherein the grab event is detected based on a measurement from a sensor mounted to the housing.

6. The method of claim 5, wherein:
the sensor comprises an inertial measurement unit; and
the grab event comprises an orientation change of the aerial system greater than a threshold orientation change, wherein the orientation change is sampled by the inertial measurement unit.

7. The method of claim 6, wherein the threshold orientation change is 35°.

8. The method of claim 1, further comprising:
after operating the rotor in the standby mode, operating the rotor in a second flight mode;
while operating the rotor in the second flight mode, detecting an actuation of a switch mechanically coupled to the housing; and
in response to detecting the actuation, operating the rotor in a second standby mode.

9. The method of claim 5, wherein detecting the grab event comprises classifying the grab event as indicative of the aerial system being grabbed, based on the measurement.

10. The method of claim 1, wherein the rotor defines a swept area, wherein the aerial system defines a retention region, and wherein a projection of the retention region onto a rotor plane normal to the rotor axis overlaps a majority of a projection of the swept area onto the rotor plane.

11. A method for controlling an aerial system including a central axis extending normal to a lateral plane of the aerial system, the method comprising:
generating a first aerodynamic force with a set of rotors of the aerial system, each rotor of the set of rotors enclosed by a housing of the aerial system, wherein the first aerodynamic force is substantially equal to a total aerodynamic force generated by the aerial system;
after generating the first aerodynamic force, at the aerial system, detecting that an acute angle between the central axis and a gravity vector is greater than 35°; and
in response to detecting that the acute angle is greater than 35°, operating each rotor of the set of rotors to cooperatively generate a second aerodynamic force less than the first aerodynamic force with the set of rotors.

12. The method of claim 11, wherein operating each of rotor of the set of rotors to cooperatively generate a second aerodynamic force comprises reducing a power provided to the set of rotors to less than a power threshold required for aerial system flight.

13. The method of claim 11, further comprising, at the aerial system, detecting a start event indicative of aerial system free-fall, wherein generating the first aerodynamic force is performed automatically in response to detecting the start event.

14. The method of claim 13, wherein detecting the start event comprises detecting a proper acceleration having a magnitude substantially equal to zero with an accelerometer mechanically coupled to the housing.

15. The method of claim 11, further comprising, at the aerial system:
after generating the first aerodynamic force, optically detecting a retention mechanism; and
in response to detecting the retention mechanism and before detecting that the acute angle is greater than 35°, automatically controlling the aerial system to fly proximal the retention mechanism.

16. The method of claim 15, wherein the retention mechanism is a human hand.

17. The method of claim 11, wherein a sum of a square of a diameter of each rotor of the set is greater than 50% of an area of a convex hull of a projection of the aerial system onto the lateral plane.

18. The method of claim 17, wherein the aerial system comprises a retention region, wherein a projection of a total swept area of the set of rotors onto the lateral plane overlaps a projection of the retention region onto the lateral plane.

19. The method of claim 11, wherein the housing comprises a plurality of airflow apertures fluidly connecting each rotor to an ambient environment, wherein each aperture is smaller than a threshold size.

20. The method of claim 11, further comprising, at the aerial system, detecting a start event indicative of aerial system support in a substantially horizontal orientation throughout a time interval greater than a threshold time interval, wherein generating the first aerodynamic force is performed automatically in response to detecting the start event.

21. A method for controlling an aerial system comprising a rotor, the method comprising:
detecting a start event indicative of aerial system support in a substantially horizontal orientation for a time interval greater than a threshold time interval; and
at a processor mounted to the housing of the aerial system, in response to detecting the start event, automatically operating the rotor in a flight mode, wherein the rotor is enclosed by a housing of the aerial system and configured to rotate about a rotor axis.

22. The method of claim 21, further comprising:
while operating the rotor in the flight mode, detecting a grab event indicative of the aerial system being grabbed; and
at the processor, in response to detecting the grab event, automatically operating the rotor in a standby mode.

* * * * *